United States Patent
Stahl et al.

(10) Patent No.: US 12,086,936 B2
(45) Date of Patent: Sep. 10, 2024

(54) METHOD OF DETERMINING LAYER THICKNESSES OF 3D MODELS FOR ADDITIVE MANUFACTURING

(71) Applicants: DENTSPLY SIRONA Inc., York, PA (US); SIRONA DENTAL SYSTEMS GMBH, Bensheim (DE)

(72) Inventors: Christian Stahl, Darmstadt (DE); Daniel Weiss, Heddesheim (DE)

(73) Assignee: DENTSPLY SIRONA INC., York, PA (US)

( * ) Notice: Subject to any disclaimer, the term of this patent is extended or adjusted under 35 U.S.C. 154(b) by 188 days.

(21) Appl. No.: 17/604,471

(22) PCT Filed: Apr. 24, 2020

(86) PCT No.: PCT/EP2020/061486
§ 371 (c)(1),
(2) Date: Oct. 18, 2021

(87) PCT Pub. No.: WO2021/018425
PCT Pub. Date: Feb. 4, 2021

(65) Prior Publication Data
US 2022/0207829 A1    Jun. 30, 2022

(30) Foreign Application Priority Data
Apr. 29, 2019 (EP) .................................. 19171494

(51) Int. Cl.
*G06T 17/20*     (2006.01)
*A61C 1/08*       (2006.01)
(Continued)

(52) U.S. Cl.
CPC .............. *G06T 17/20* (2013.01); *A61C 1/082* (2013.01); *B29C 64/393* (2017.08); *B33Y 50/02* (2014.12);
(Continued)

(58) Field of Classification Search
None
See application file for complete search history.

(56) References Cited

U.S. PATENT DOCUMENTS

2014/0203463 A1     7/2014    Haber
2021/0107231 A1 *   4/2021    Yao ........................ B29C 64/393

FOREIGN PATENT DOCUMENTS

| CN | 108501381 A  | 9/2018  |
| JP | 2001277368 A | 10/2001 |
| JP | 2016501139 A | 1/2016  |

OTHER PUBLICATIONS

Lee CH, Varshney A, Jacobs DW; "Mesh saliency;" ACM Transactions Graphics 2005;24(3):pp. 659-666 (Year: 2005).*

(Continued)

*Primary Examiner* — Edward Martello
(74) *Attorney, Agent, or Firm* — DENTSPLY SIRONA INC.

(57) ABSTRACT

The present invention relates to a method of determining layer thicknesses of a three-dimensional model for generation with an additive manufacturing apparatus. The method includes: a step of determining the layer thicknesses according to an adaptive slicing algorithm in which the thickness of a layer is calculated through a relation based on the inclination of the normal vectors of the surface elements of the 3D model partly enclose the layer from a horizontal direction (x;y).

12 Claims, 3 Drawing Sheets

(51) Int. Cl.
  *B29C 64/393* (2017.01)
  *B29L 31/00* (2006.01)
  *B33Y 50/02* (2015.01)
  *B33Y 80/00* (2015.01)
(52) U.S. Cl.
  CPC ....... *B29L 2031/7546* (2013.01); *B33Y 80/00* (2014.12); *G06T 2210/36* (2013.01)

(56) References Cited

OTHER PUBLICATIONS

Liu et al.; "Salient critical points for meshes;" SPM '07: Proceedings of the 2007 ACM symposium on Solid and physical modeling; pp. 277-282 (Year: 2007).*
Huachao Mao et al.; "Adaptive Slicing based on efficient profile analysis"; Computer Aided Design; vol. 107, Feb. 1, 2019; pp. 89-101 (DOI: 10.1016/j.cad.2018.09.006).
International Search Report; PCT/EP2020/061486; Dec. 17, 2020 (completed); Jan. 12, 2021 (mailed).
Written Opinion of the International Searching Authority; Dec. 17, 2020 (completed); Jan. 12, 2021 (mailed).
International Preliminary Report on Patentability; Dec. 17, 2020 (completed); Jan. 12, 2021 (mailed).
Japanese Office Action dated Mar. 12, 2024.

* cited by examiner

METHOD OF DETERMINING LAYER THICKNESSES OF 3D MODELS FOR ADDITIVE MANUFACTURING

CROSS-REFERENCE TO RELATED APPLICATIONS

This is a National Phase application of International Application No. PCT/EP2020/061486, filed Apr. 24, 2020, which claims the benefit of and priority to European Application Ser. No. 19171494.8, filed on Apr. 29, 2019, which are herein incorporated by reference for all purposes.

TECHNICAL FIELD OF THE INVENTION

The present invention relates to an additive manufacturing system having an additive manufacturing apparatus. The present invention more particularly relates to a method of determining layer thicknesses of a three-dimensional model for generation with an additive manufacturing apparatus.

BACKGROUND ART OF THE INVENTION

In additive manufacturing, a three-dimensional model is printed layer-by-layer through light-based curing of a liquid printing medium i.e., a liquid photocurable resin, which is selectively cured under the influence of UV radiation. In commonly known variations of additive manufacturing such as SL (Stereolithography) or DLP (Digital Light Processing), the 3D objects are preferably pulled upside-down from the liquid printing medium by means of a platform. The duration of the printing process depends, among other factors, on the number of layers to be printed. Therefore, it takes longer to print the 3D model in many thin layers than to print in a few thick layers. The layer thickness in which the 3D model is printed, defines the resolution of the printing process in the printing direction (hereinafter the z-direction). For a detailed printing and a high-resolution in the z-direction, it is therefore necessary to choose thin layers at the expense of the printing speed. Depending on the geometry of the 3D model to be printed and its orientation in the printing volume, however, the same resolution i.e., layer thickness is not necessary at every z position.

Surface elements whose normal vector is perpendicular to the z-axis have smaller deviations from the desired geometry even at large layer thicknesses than surface elements whose normal vectors are parallel to the z-axis. For comparison this is shown in FIG. 1 and FIG. 2 by using the examples of a sphere. The "step-effect" and thus the deviation of the printed 3D model from the desired geometry is much more conspicuous in the upper part and the lower part of the sphere (surface normal rather parallel to the z-axis) than in the middle part (surface normal rather perpendicular to the z-axis). In the upper part and the lower part, thin layers are necessary to precisely map the desired geometry, whereas in the middle part, even with thick layers, a good reproduction of the desired geometry is possible.

With the so-called "adaptive slicing" method, local layer thicknesses are calculated based on the geometry of a 3D model to be printed in such a way that the maximum value of a layer thickness is set for a required reproduction accuracy (hereinafter standard or reference precision requirement), and thus the duration of the printing process is minimized. Such a choice of layer thicknesses is shown in FIG. 3. The step-effect is the same regardless of the z position as shown in FIG. 3. In the adaptive slicing method, the layer thicknesses are determined according to an adaptive slicing algorithm in which the thickness of a layer is calculated through a relation based on the inclination of the normal vectors of the surface elements of the 3D model which at least partly enclose the layer from a horizontal direction. When the normal vector with the smallest inclination of such surface elements is perpendicular (or parallel) to the z-axis, then the calculated layer thickness has a maximum (or minimum) value. For rotationally non-symmetric models, for a given z-interval, the surface element whose normal has the smallest angle with the z-axis always dominates the respective layer thickness. Furthermore, the calculated layer thicknesses are limited by a minimum value and a maximum value. With this well-known adaptive slicing method, a constant printing accuracy such as a standard precision requirement can be achieved for the entire 3D model.

In the journal of Computer-Aided Design vol. 107 (2019) pages 89-101, an adaptive slicing based on efficient profile analysis is disclosed by H. Mao et al.

A further reduction of the number of layers and thus a further reduction of the printing duration is not possible with the adaptive slicing method. Therefore, the printing duration must be accepted, and if not, a lower printing quality must be accepted.

In many dental 3D objects, the same printing accuracy is not required on every surface element of the 3D object. An example of such a 3D object is a drilling template. At the top of the drilling template, in contrast to those parts where the template rests on the tooth or where the drill is guided, no special accuracy is necessary. However, the adaptive slicing method cannot be flexibly applied to such dental 3D models to allow further reduction of the printing time without reducing the overall printing quality.

US 2014/0203463 A1 discloses a drill guide which employs multiple layers of materials with different mechanical properties in order to achieve concurrent goals of rigidity, fit and retention. For example, a rigid exterior shell and a soft interior is used together to securely and precisely fit a drill guide to a surgical site.

SUMMARY

An objective of the present invention is to overcome the disadvantages of the prior art in a flexible way and to provide a method of determining layer thicknesses of a three-dimensional model for generation with an additive manufacturing apparatus.

This objective has been achieved by the method as defined in claim 1. The subject-matters of the dependent claims relate to further developments.

The present invention provides a method of determining layer thicknesses of a three-dimensional model for generation with an additive manufacturing apparatus (hereinafter modified adaptive slicing method). The method comprises: a step of determining the layer thicknesses according to an adaptive slicing algorithm in which the thickness of a layer is calculated through a relation based on the inclination of the normal vectors of the surface elements of the 3D model which at least partly enclose the layer from a horizontal direction. The method is characterized by further comprising: a step of selectively imposing on at least one surface element of the 3D model a precision requirement out of one or more selectable different precision requirements which respectively differently alter in the determination step the relation with respect to the inclination of the normal vector of the said at least one surface element.

A major advantageous effect of the present invention is that the existing method in 3D printing, namely the above-mentioned method of adaptive slicing, is further modified to achieve an improvement in the printing process regarding the printing duration by further allowing selective imposition of precision requirements onto the surface elements. Thus, the surface elements with a high precision requirement can be printed relatively fine whereas surface elements with a low precision requirement can be printed relatively coarse. Thereby, for instance, the low precision requirements for certain surface elements can be used to save additional layers in the modified adaptive slicing method, and thus the printing process can be further accelerated. Furthermore, the high precision requirements for certain surface elements can be used to print additional layers, and thus the printing accuracy can be locally further increased without comparatively prolonging the printing process.

According to the present invention, the selectable different precision requirements may comprise at least one of a high precision requirement and a low precision requirement. The high precision requirement allows, through the altered relation, the layer thickness to obtain a value smaller than the layer thickness determined through the unaltered relation that corresponds to the reference precision requirement. Thereby, the printing accuracy can be locally increased, and thus the prolongation of the printing duration can be comparatively decreased in contrast to applying the high precision requirement to the whole 3D model as in the well-known adaptive slicing method. The low precision requirement allows, through the altered relation, the layer thickness to obtain a value larger than the layer thickness determined through the unaltered relation that corresponds to the reference precision requirement. Thereby, the printing accuracy can be locally reduced, and thus the printing duration can be further decreased. The reference precision requirement lies between the low precision requirement and the high precision requirement.

According to the present invention, the precision requirement with the highest printing accuracy may dominate the layer thicknesses such that among the layer thicknesses calculated for surface elements corresponding to the same layer, through the said relation and imposed through the one or more differently altered relations, the smallest value is determined as the layer thickness.

According to the present invention, the selective imposing step may be automatically performed through a software algorithm based on the characteristic features of the 3D model to be manufactured and/or the characteristics of the manufacturing process. For instance, if the 3D model is a drilling template, then at the top of the drilling template, in contrast to those parts where the template rests on the tooth or where the drill is guided, the precision requirement may be imposed as low. And at the parts where the template rests on the tooth or where the drill is guided, the precision requirement may be imposed as high. The drilling template is preferably printed, as a single piece, by using the same photocurable resin in a layer-by-layer printing process. Alternatively, the software algorithm may allow the selective imposing step to be performed manually. In the manual selective imposing step, the user may selectively mark on the display of the 3D model the surface elements for which a precision requirement out of one or more selectable different precision requirements is to be imposed. The marking may be performed through an input means such as a keyboard or a mouse and the like.

According to the present invention, the selective imposition of the precision requirements in the selective imposing step may be further restricted in various alternative ways, for instance, to prevent undesired printing accuracy or prolongation of printing duration. In a first alternative, one or more surface elements of the 3D model may be selected on which one or more precision requirements may be selectively imposed. Alternatively, one or more surface elements of the 3D model may be selected on which one or more precision requirements must not be imposed.

According to the present invention, the determined layer thicknesses are constrained by a maximum value and a minimum value. The maximum value and the minimum value may be preset in the software algorithm or manually set by the user in correspondence with a standard or reference precision requirement. Different pairs of maximum and minimum values may be selectively set by the user.

The present invention also provides a computer-program having codes, namely a software algorithm for causing a computer-based system to execute the above method. The computer-program may be stored on a computer-readable storage means which is provided separately from or together with the computer-based system. The computer-based system may have a display for displaying the 3D model to the user, and an input means for allowing the user to selectively mark on the display of the 3D model the surface elements or input other relevant information such as setting information and the like relating to the software algorithm. The computer-based system may be provided as a computer-based additive manufacturing system or apparatus for executing the above method and generating the 3D object corresponding to the 3D model. The computer-based system may be further provided with a post-processing apparatus for post-processing (washing, drying, curing) the 3D object generated with the computer-based additive manufacturing apparatus.

BRIEF DESCRIPTION OF THE DRAWINGS

In the subsequent description, further aspects and advantageous effects of the present invention will be described in more detail by using exemplary embodiments and referring to the drawings, wherein FIG. 1—is a three-dimensional spherical model having thin layers according to a comparative example.

DETAILED DESCRIPTION OF THE INVENTION

Figure 1:
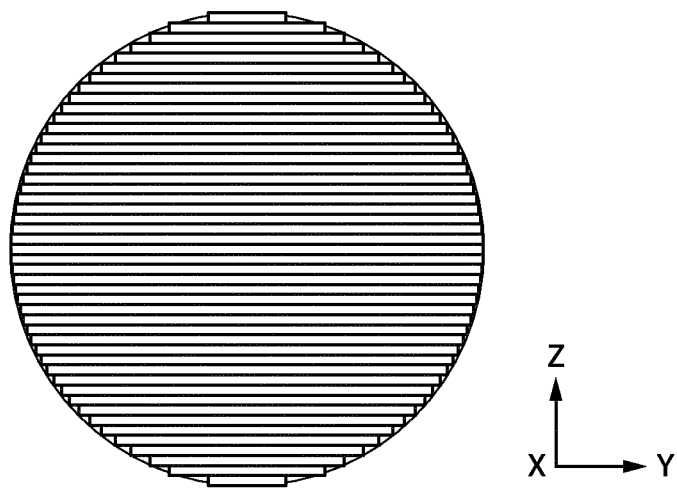
Figure 3:
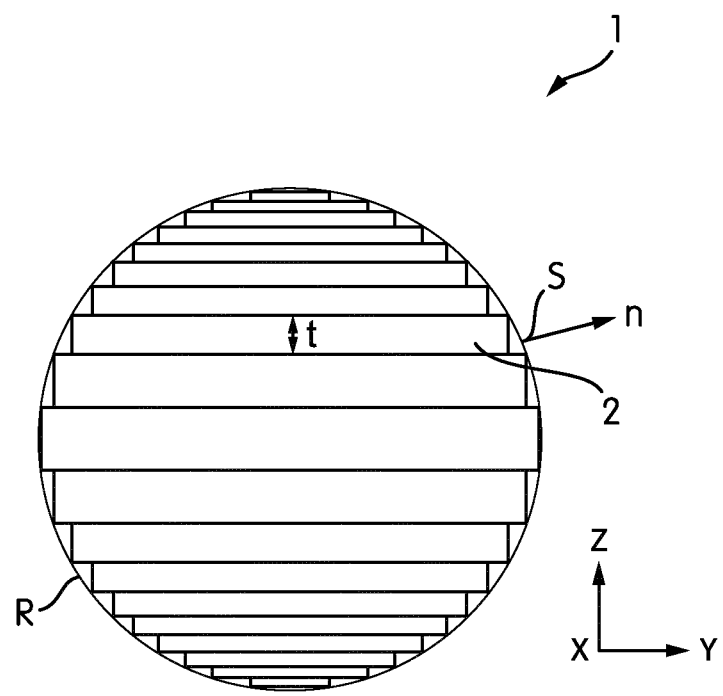
FIG. 3—is another three-dimensional spherical model having layers solely determined through the adaptive slicing algorithm known from the prior art.

The reference numbers shown in the drawings denote the elements as listed below and will be referred to in the subsequent description of the exemplary embodiments:

1. 3D model (Object)
2. Layer
t: Layer thickness n: Normal vector
S: Surface element
x, y: Horizontal direction
L: Low precision requirement
R: Reference precision requirement The present invention provides a method of determining layer thicknesses (t) of a three-dimensional model (1) for generation with an additive manufacturing apparatus. The method comprises: a step of determining the layer thicknesses (t) according to an adaptive slicing algorithm in which the thickness of a layer (2) is calculated through a relation based on the inclination of the normal vectors (n) of surface elements (s) of the 3D model (1) which at least partly enclose the layer (2) from a horizontal direction (x; y). FIG. 3 shows a sphere as a comparative example of a 3D model (1) whose layer thicknesses (t) have been determined according to the said adaptive slicing algorithm well known in the prior art.

Figure 4:
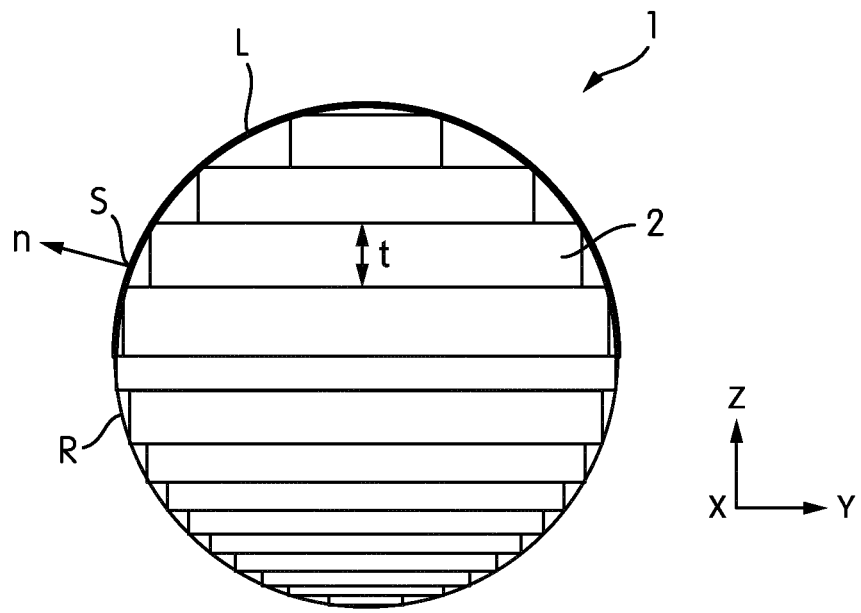
FIG. 4—is another three-dimensional spherical model having layers determined through the modified adaptive slicing algorithm according to an embodiment of the present invention.

The method of the present invention further comprises: a step of selectively imposing on at least one surface element (s) of the 3D model (1) a precision requirement out of one or more selectable different precision requirements which respectively differently alter in the determination step the said relation with respect to the inclination of the normal vector (n) of the said at least one surface element (s). FIG. 4 shows a sphere as an example of a 3D model (1) whose layer thicknesses (t) have been determined according to an embodiment of the present invention. In this embodiment, the one or more selectable different precision requirements comprises at least a low precision requirement (L) which allows, through the altered relation, the layer thickness (t) to obtain a value larger than the layer thickness (t) determined through the unaltered relation. As shown in FIG. 4, the low precision requirement (L) is selected and imposed on the entire upper hemisphere which is marked with a bold arc. In this simplest embodiment, in the determination of the layer thicknesses (t), the surface elements (s) with the low precision requirement (L) are treated as if their normal vectors (n) were all perpendicular to the z-axis, and thus alter, in the determination step, the said relation with respect to the inclinations of the normal vectors (n) of the said surface elements (s). Thereby, these surface elements (s) do not lead to the same layer thicknesses (t), as shown in FIG. 3, and calculated through the unaltered relation based on the real geometry according to the adaptive slicing algorithm. As shown in FIG. 4, in the upper hemisphere having the low precision requirement (L) as marked with the bold arc, all layer thicknesses (t) obtain a maximum value which is larger than those of the corresponding layers (2) in the comparative example of the 3D sphere in FIG. 3, while in the lower hemisphere the adaptive slicing algorithm is applied as usual, namely with a reference precision requirement (R).

Figure 5:
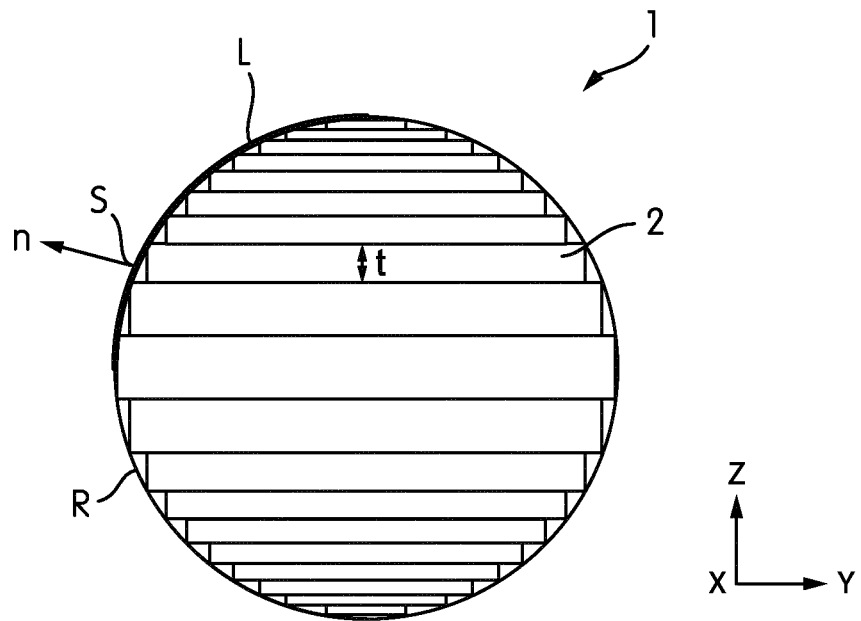
FIG. 5—is another three-dimensional spherical model having layers determined through the modified adaptive slicing algorithm according to another embodiment of the present invention.

FIG. 5 shows another sphere as an example of a 3D model (1) whose layer thicknesses (t) have been determined according to an embodiment of the present invention. As shown in FIG. 5, the low precision requirement (L) is selected and imposed only on the entire left upper half hemisphere as marked with the bold arc and is thus dominated by the right upper half hemisphere that doesn't have the low precision requirement (L) but the reference precision requirement (R) which is higher. In this embodiment, among the layer thicknesses (t) calculated for the surface elements (s) corresponding to the same layer (2) through the said relation and imposed through the one or more differently altered relations, the smallest value is determined as the layer thickness (t). Therefore, despite of the low precision requirement (L) imposed on the left upper half hemisphere, these surface elements (s) lead to the same layer thicknesses (t) as shown in FIG. 3. Thus, the adaptive slicing algorithm is applied as usual namely with the reference precision requirement (R).

The present invention is not limited to a low precision requirement (L). In another embodiment (not shown), the one or more selectable different precision requirements comprises at least a high precision requirement which allows, through the altered relation, the layer thickness (t) to obtain a value smaller than the layer thickness (t) determined through the unaltered relation that corresponds to the reference precision requirement (R).

The reference precision requirement (R) lies between the low precision requirement (L) and the high precision requirement.

In another embodiment, the method comprises a step of displaying the 3D model (1) to a user on a display; and a step of allowing the user to selectively mark on the display of the 3D model (1) the surface elements (s) for which a precision requirement out of one or more selectable different precision requirements is imposed.

In another embodiment, the method comprises a step of selecting one or more surface elements (s) of the 3D model (1) on which one or more precision requirements may be selectively imposed. In an alternative embodiment, the method comprises a step of selecting one or more surface elements (s) of the 3D model (1) on which one or more precision requirements must not be imposed. Through either of the alternative embodiments, the selective imposition of the precision requirements can be restricted.

In another embodiment, the determined layer thicknesses (t) are constrained by a maximum value and a minimum value which are preset or adjustable by the user.

Figure 2:
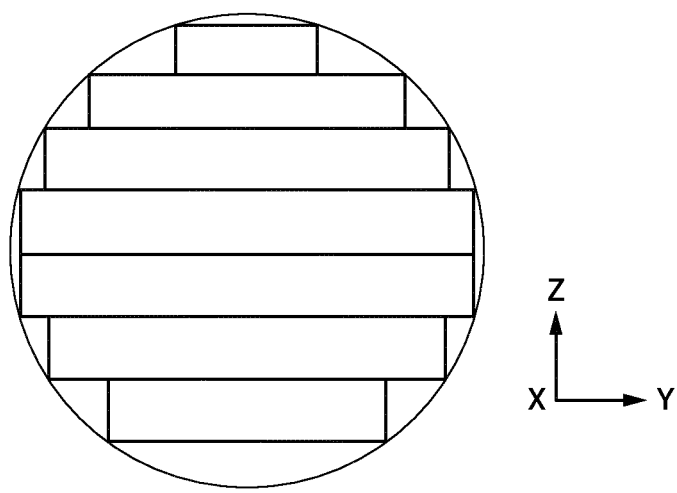
FIG. 2—is another three-dimensional spherical model having thick layers according to another comparative example.

The comparative examples of the 3D spheres respectively shown in FIG. 1 to FIG. 3 can be also obtained by the method of the present invention. For instance, the 3D sphere in FIG. 1 can be obtained through imposing a high precision requirement onto the entire surface i.e., onto all surface elements (s). Thereby all surface elements (s) with the high precision requirement are treated as if their normal vectors (n) were all parallel to the z-axis, and thus all layer thicknesses (t) obtain a minimum value which is equal to or smaller than those of the corresponding layers (2) in the comparative example of the 3D sphere in FIG. 3.

For instance, the 3D sphere in FIG. 2 can be obtained through imposing the low precision requirement (L) onto the entire surface i.e., onto all surface elements (s). Thereby all surface elements (s) with the low precision requirement (L) are treated as if their normal vectors (n) were all perpendicular to the z-axis, and thus all layer thicknesses (t) obtain a maximum value which is equal to or larger than those of the corresponding layers (2) in the comparative example of the 3D sphere in FIG. 3.

For instance, the 3D sphere in FIG. 3 can be obtained through imposing none of the different high/low precision requirements onto the entire surface. Thereby all surface elements (s) are treated according to the real geometry, and thus the adaptive slicing algorithm is applied as usual namely with the reference precision requirement (R).

The invention claimed is:
1. A method of determining layer thicknesses (t) of a three-dimensional model for generation of a corresponding three-dimensional object with an additive manufacturing apparatus, the method comprising:
determining the layer thicknesses (t) according to an adaptive slicing algorithm in which the thickness of a layer is calculated through a relation which defines a reference precision requirement (R), and is based on the inclination of the normal vectors (n) of the surface elements (s) of the 3D model which at least partly enclose the layer from a horizontal direction (x;y), the method further comprising:

selectively imposing on at least one surface element (s) of the 3D model a precision requirement out of one or more selectable different precision requirements which respectively differently alter in the determination the relation with respect to the inclination of the normal vector (n) of the said at least one surface element (s), wherein the one or more selectable different precision requirements comprise at least one of a high precision requirement which allows, through the altered relation, the layer thickness (t) to obtain a value smaller than the layer thickness (t) determined through the unaltered relation; and a low precision requirement (L) which allows, through the altered relation, the layer thickness (t) to obtain a value larger than the layer thickness (t) determined through the unaltered relation, and wherein the reference precision requirement (R) is between the low precision requirement (L) and the high precision requirement and, wherein among the layer thicknesses (t) calculated for surface elements (s) corresponding to the same layer through the said relation and imposed through the one or more differently altered relations, the smallest value is determined as the layer thickness (t).

2. The method according to claim 1, further comprising:
selecting one or more surface elements (s) of the 3D model on which one or more precision requirements may be selectively imposed.

3. The method according to claim 1, further comprising:
selecting one or more surface elements (s) of the 3D model on which one or more precision requirements must not be imposed.

4. The method according to claim 1, further comprising:
displaying the 3D model to a user on a display; and
allowing the user to selectively mark on the display of the 3D model the surface elements (s) for which a precision requirement out of one or more selectable different precision requirements is to be imposed.

5. The method according to claim 1, wherein the determined layer thicknesses (t) are constrained by a maximum value and a minimum value.

6. The method according to claim 1, wherein the selective imposing is further based on the characteristic features of the 3D model to be manufactured and/or the characteristics of the additive manufacturing process.

7. A three-dimensional object corresponding to a 3D model according to claim 1, wherein the 3D object is a single piece dental drilling template, wherein at the top of the drilling template, in contrast to those parts where the said template rests on the tooth or where the drill is guided, the precision requirement imposed is a low precision requirement (L), and at the parts where the said template rests on the tooth or where the drill is guided, the precision requirement imposed is a high precision requirement.

8. A non-transitory computer readable medium having stored thereon computer-executable instructions, which when executed by a computer-based system, causes the computer-based system to execute the method according to claim 1.

9. A computer-based system which is adapted to execute the method according to claim 1.

10. A computer-based system according to claim 9, further comprising:
a display for displaying the 3D model to the user; and
an input means for allowing the user to selectively mark on the display of the 3D model the surface elements (s).

11. The computer-based system according to claim 9, wherein the computer-based system further comprises an additive manufacturing apparatus for generating the three-dimensional object.

12. The computer-based system according to claim 11, wherein the computer-based system further comprises a post-processing apparatus for post processing the 3D object generated by the additive manufacturing apparatus.

* * * * *